United States Patent
Schmidtlein et al.

(10) Patent No.: US 8,493,007 B2
(45) Date of Patent: Jul. 23, 2013

(54) METHOD FOR ASCERTAINING MEASURED VALUES IN A CYCLICALLY CONTROLLED SYSTEM

(75) Inventors: Andreas Schmidtlein, Tamm (DE); Rainer Baumgaertner, Pfaffenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 13/056,915

(22) PCT Filed: Jul. 27, 2009

(86) PCT No.: PCT/EP2009/059662
§ 371 (c)(1),
(2), (4) Date: Apr. 21, 2011

(87) PCT Pub. No.: WO2010/012681
PCT Pub. Date: Feb. 4, 2010

(65) Prior Publication Data
US 2011/0274415 A1    Nov. 10, 2011

(30) Foreign Application Priority Data
Aug. 1, 2008  (DE) .......................... 10 2008 040 929

(51) Int. Cl.
*H02P 7/00* (2006.01)
*H02P 5/00* (2006.01)
*G05D 23/275* (2006.01)
*B64C 17/06* (2006.01)
*G01R 15/00* (2006.01)

(52) U.S. Cl.
USPC ........... 318/140; 318/268; 318/632; 318/649; 388/800; 702/57

(58) Field of Classification Search
USPC ...... 318/140, 268, 632, 649; 388/800; 702/57
See application file for complete search history.

(56) References Cited

U.S. PATENT DOCUMENTS

| | | | | |
|---|---|---|---|---|
| 4,244,340 A | * | 1/1981 | Herth et al. | 123/688 |
| 4,661,750 A | * | 4/1987 | Mori | 388/811 |
| 4,736,316 A | * | 4/1988 | Wallman | 700/29 |
| 6,075,329 A | * | 6/2000 | Liao et al. | 318/268 |

(Continued)

FOREIGN PATENT DOCUMENTS

| | | |
|---|---|---|
| DE | 103 59 224 | 4/2005 |
| DE | 10 2005 13143 | 9/2006 |

(Continued)

*Primary Examiner* — Walter Benson
*Assistant Examiner* — Gabriel Agared
(74) *Attorney, Agent, or Firm* — Kenyon & Kenyon LLP

(57) ABSTRACT

A method for ascertaining measured values in a cyclically controlled system, the cyclic control having control time periods in which the system is controlled, and no-control time periods in which the system is not controlled, having the following operations of determining first integration time periods as a function of the cyclic control, the first integration time periods being situated within at least one of the control time periods, and/or determining second integration time periods as a function of the cyclic control, the second integration time period being situated within at least one of the no-control time periods; detecting one of the measured variables of the system dependent on the control; ascertaining summation and/or integration values by summation and/or integration of the measured variable during the first and/or second integration time periods; ascertaining the measured value for at least one of the control time periods and/or no-control time periods on the basis of time data of the first and/or second integration time periods and of the ascertained summation and/or integration values.

12 Claims, 5 Drawing Sheets

U.S. PATENT DOCUMENTS

| | | | |
|---|---|---|---|
| 6,597,146 B1 * | 7/2003 | Rehm et al. | 318/632 |
| 6,933,873 B1 | 8/2005 | Horsley et al. | |
| 2005/0231253 A1 | 10/2005 | Smarandache | |
| 2007/0103333 A1 * | 5/2007 | Michalski et al. | 340/853.1 |
| 2007/0109821 A1 | 5/2007 | Yang | |

FOREIGN PATENT DOCUMENTS

| | | |
|---|---|---|
| EP | 0 675 604 | 10/1995 |
| JP | 54 104766 | 8/1979 |
| JP | 2005-323488 | 11/2005 |

* cited by examiner

METHOD FOR ASCERTAINING MEASURED VALUES IN A CYCLICALLY CONTROLLED SYSTEM

FIELD OF THE INVENTION

The present invention describes a method for ascertaining measured values in a cyclically controlled system. In particular, the present invention relates to a method for ascertaining measured values in a cyclically controlled system for ascertaining the rotational speed of a DC motor.

BACKGROUND INFORMATION

In cyclic systems there is often a need for recording measured values in parallel, i.e., more or less simultaneously, for control. Measured values dependent on the control put high demands on measured value processing. Traditional methods which operate using analog filters, for example, are difficult to implement. Their configuration is static and cannot be adjusted during operation. Although this situation may be improved by using sample elements and hold elements, in systems in which the control constantly changes and/or in which an additional, possibly varying interference signal is superimposed on the measured signal, the configuration options of the measuring environment using sample and hold elements are limited.

In controlling an electric motor, in particular in the case when the coasting voltage is measured in generator operation of DC motors, there is the problem that in conventional methods the influence of speed-dependent interference signal components is relatively great.

SUMMARY OF THE INVENTION

The exemplary embodiment and/or exemplary method of the present invention are believed to overcome the above-described problem by providing a method for ascertaining measured values in a cyclically controlled system, the cyclic control having control time periods in which the system is controlled and having no-control time periods in which the system is not controlled, having the following steps: determining first integration time periods as a function of the cyclic control, the first integration time periods being situated within at least one of the control time periods, and/or determining second integration time periods as a function of the cyclic control, the second integration time period being situated within at least one of the no-control time periods, detecting one of the measured variables of the system dependent on the control, ascertaining summation and/or integration values by summation and/or integration of the measured variable during the first and/or second integration time periods, ascertaining the measured value for at least one of the control time periods and/or no-control time periods on the basis of time data of the first and/or second integration time periods and of the ascertained summation and/or integration values.

The method according to the present invention has the advantage that it is adjustable during the operation of the cyclically controlled system. In addition, this method allows a measured value to be detected over a plurality of control time periods. This makes accurate determination of measured values not only in no-control time periods, but also in control time periods possible, in which the use of conventional methods is impracticable, for example, due to the necessary settling times and physical limitations.

The first and/or second integration time periods may be determined also as a function of at least one individual parameter of the system. This individual parameter may be a system-immanent parameter, i.e., a parameter provided by the hardware or software configuration of the system itself, or also a measured value output by the system. This may allow a feedback option back from the system to the measuring environment to be created, which makes implementing a regulating circuit between system and measuring environment possible.

The inertia of the system and/or of its measuring environment may be taken into account in the individual parameters. This makes it possible to include in the calculations physical realities such as finite edge slopes of the measured and/or control signals and switching delays due to inductances and capacitances during the control and/or measuring operations. It is advantageous in particular to take into account in the individual parameters the time delays in the system response to controls. Thus, for example, the delays of the switch signal and the delays in the switching operations of a functional unit of the system may be compensated by a time delay of the integration time period.

It is furthermore advantageous to take into account, in the individual parameters, the time delay in executing one or more steps of the method according to the present invention, in particular in detecting the measured variable of the system dependent on the control, in ascertaining summation and/or integration values by summation and/or integration of the measured variable during the first and/or second integration time periods, and in ascertaining the measured value for at least one of the control time periods and/or no-control time periods on the basis of time data of the first and/or second integration time periods and of the ascertained summation and/or integration values.

According to one advantageous specific embodiment of the present invention, the step of ascertaining summation and/or integration values by summation and/or integration of the measured variable during the first and/or second integration time periods includes the use of digital summation and/or analog integration. The strengths of both variants may be optimally used via such a mixed implementation.

Mixing at least one analog integration step with the aid of a voltage/frequency converter and at least one digital summation with the aid of a hardware logic composed of counters is particularly advantageous. Mixing at least one analog integration step with the aid of delta-sigma modulators and at least one digital summation with the aid of a hardware logic composed of counters is also conceivable.

According to an exemplary specific embodiment of the method according to the present invention, ascertaining the measured value includes ascertaining the generator voltage of a DC motor. The cyclically controlled system may be a DC motor. The generator voltage, in particular the generator coasting voltage of the DC motor, is suitable as a measured variable dependent on the control. The coasting voltage corresponds to the generator voltage in the uncontrolled state, i.e., in undriven coasting.

It is advantageous here that the summation and/or integration values are ascertained only during the second integration time periods within at least one of the no-control time periods. This may reduce the effect of interfering signal components which are caused by the motor during the control time periods, which ultimately may improve the quality of the ascertained coasting voltage value. This makes a more accurate motor regulation possible, in particular at low rotational speeds of the DC motor.

It is furthermore advantageous if the time data of the second integration time periods are determined as a function of the motor load and/or the motor speed. In particular the duration of the second integration time periods may be dependent on the duration of the no-control time periods within which the second integration time periods are situated. The duration of the no-control time periods may be adjusted, at least temporarily for the measuring process, as a function of the motor load and/or the motor speed in order to obtain a desired, predetermined measurement quality. Therefore, in particular at low motor speeds, at least a longer no-control time period is selected than at higher motor speeds. This makes it possible to better filter out interfering components in the lower motor speed range and to obtain higher dynamics in the higher motor speed range.

The motor speed may be ascertained on the basis of the ascertained measured value for the generator coasting voltage. The fact that the coasting voltage is proportional to the motor speed may be taken into account here. Due to the precision optimized by the method according to the present invention in determining the coasting voltage value, this proportionality allows high precision to be achieved at the same time when determining the motor speed.

Further features and advantages of specific embodiments of the present invention result from the description that follows with reference to the appended figures.

DETAILED DESCRIPTION

Initially, the different options of executing the method according to the present invention will be explained with reference to FIG. 1. This method is used for ascertaining measured values in a cyclically controlled system 101, the cyclic control having control time periods in which system 101 is controlled, and no-control time periods in which system 101 is not controlled.

In a first method sequence, integration time periods are first determined as a function of the cyclic control, the first integration time periods being situated within at least one of the control time periods (step 102.1). Additionally or alternatively, second integration time periods are determined as a function of the cyclic control, the second integration time periods being situated within at least one of the no-control time periods (step 102.2). Using this procedure, separation of the integration procedures is thus achieved, on the one hand in integration procedures during control phases and, on the other hand, in integration procedures during no-control phases. The integration procedures may extend over a plurality of separate control phases and no-control phases, but they may also run over only a portion of a single control phase or no-control phase.

In that case, a measured variable of system 101, dependent on the control, is detected (step 103). This may be the voltage, for example, which drops across a certain component of system 101. However, any other measured variable is also conceivable.

Summation and/or integration values are ascertained during the summation and/or integration of the measured variable during the first and/or second integration time periods (step 104). The execution of step 104 may include the use of digital summation and/or analog integration, i.e., may optionally be performed only on the basis of digital summation or analog integration or on the basis of a mix of both variants. In general, to illustrate the entire present invention, integration is not absolutely necessary, but any approximation method, such as discrete digital or analog summation, may be used in the actual implementation of all method steps. The basic characteristics of the method according to the present invention are independent of the selection of the integration method to be used.

Subsequently, the measured value for at least one of the control time periods and/or no-control time periods is ascertained on the basis of time data of the first and/or second integration time periods and on the basis of the ascertained summation and/or integration values (step 105). The particular start time and the particular end time of the integration time period may be considered as the time data of the first and/or second integration time periods. From these data, the duration of the particular integration time period, which, as explained above, does not need to be contiguous, may also be ascertained.

Figure 1:
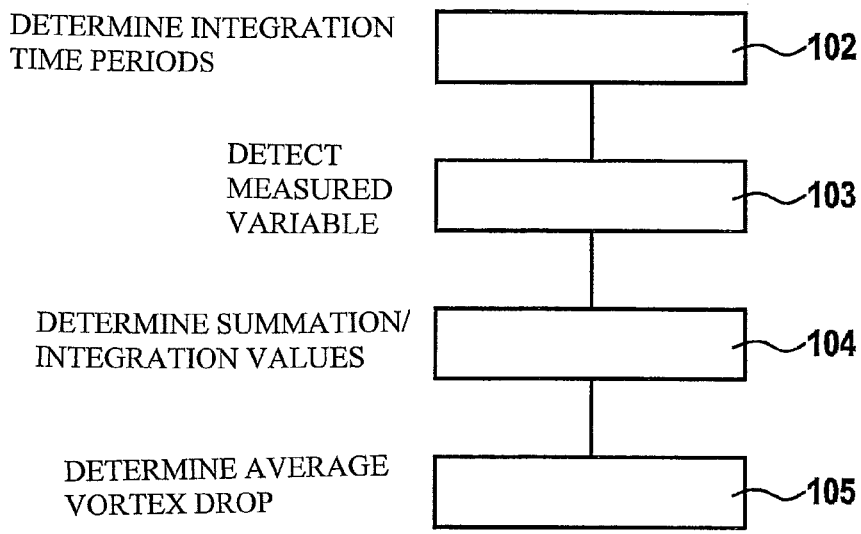
FIG. 1 shows a possible sequence of the method according to the present invention.

It should be pointed out that the sequence of the method steps illustrated in FIG. 1 is purely exemplary. A different sequence of the steps is also conceivable. Thus, for example, the first and/or second integration time periods may be determined at any point in time of the method. The measured variable of the system, dependent on the control, does not necessarily have to be detected after determining the first and/or second integration time periods, but the measured variable may also be detected and possibly recorded in advance, almost keeping it in reserve.

Figure 2:
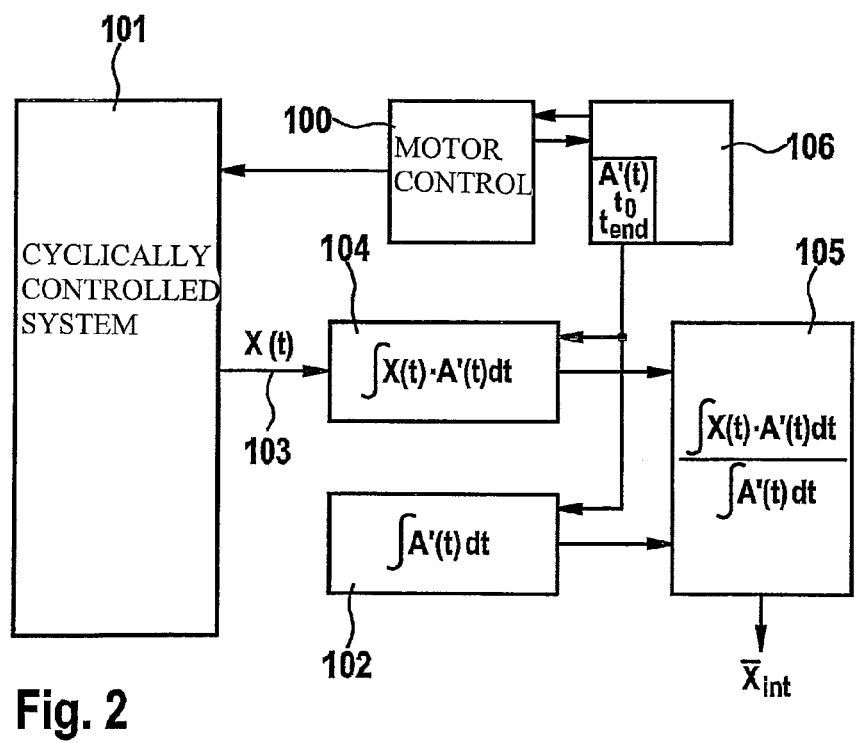
FIG. 2 shows an explanatory illustration of an advantageous cooperation of the steps of the method according to the present invention.
Figure 3:
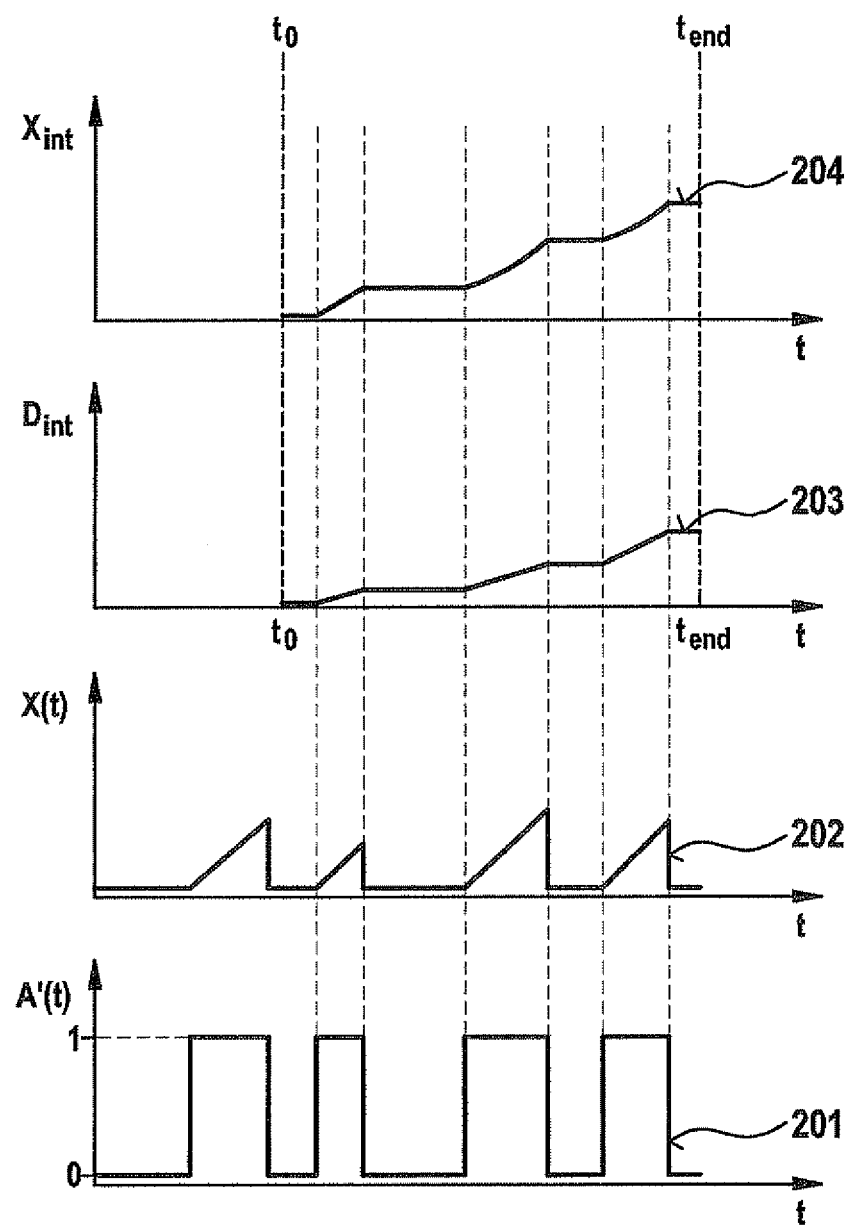
FIG. 3 shows the time graph of different signals within the execution of the method according to the present invention.

In the following, taking into consideration FIGS. 1, 2, and 3, an advantageous cooperation of the steps of the method according to the present invention is illustrated with reference to the variation over time of different signals while executing the method according to the present invention.

Signal X(t) 202 to be measured, i.e., the measured variable of system 101, dependent on the control, is detected in step 103 and supplied to the input of an evaluation logic. The evaluation logic computes, for example, by integrating, integral $X_{int}$ during the control time periods of the switch, i.e., in those time periods in which switch function A(t) assumes the value 1. Since actual systems have only finite edge slopes, both system 101 and its measuring environment respond with a delay. Therefore, switch function A'(t) 201, which is relevant for the detection of the measured variable, writes to control 100 taking into account the individual physical conditions such as switching delays, inductances, and capacitances. Contrary to actual switch control A(t) (not illustrated), in the case of the relevant switch function A'(t), only the points in time which are relevant to the measurement are identified by a function value equal to 1. A'(t) may result from a time shift, for example, such as a shift by a few microseconds, to take into account the switching operations at the motor switch of system 101. Another option is the totally free definition of switch function A'(t), for example, that the positive, i.e., rising edge of A'(t) follows the positive edge of A(t) by a few x microseconds, and the falling edge of A'(t) follows, also in a freely definable manner, the falling edge of A(t) by a few y microseconds. This allows control ranges caused by inductances, for example, to be ruled out from the measurement.

The following then applies to integral $X_{int}$ over measured variable X(t) during the control time periods:

$$X_{int} = \int X(t) \cdot A'(t) dt \qquad \text{(step 104)}$$

In addition, the evaluation logic includes a functionality for ascertaining the total control time period of the motor switch during the measurement period:

$$D_{int} = \int A'(t) dt \qquad \text{(Graph 203, step 102)}$$

$X_{int}$ and $D_{int}$ may be ascertained synchronously. This makes measurement over a predetermined time period possible. The integration limits are identified in FIG. 3 as $t_0$ and $t_{end}$. An appropriate sequence controller 106 generates A'(t) and $t_0$ and $t_{end}$ as a function of the selected implementation. The evaluation software is then in a position, for example, to ascertain the average voltage drop $\overline{X}_{int}$ in the measuring time period on the basis of the following equation:

$$\overline{X}_{int} = \frac{\int_{t_0}^{t_{end}} X(t) \cdot A'(t) dt}{\int_{t_0}^{t_{end}} A'(t) dt} \qquad \text{(Graph 204, step 105)}$$

$\overline{X}_{int}$ then represents the measured value ascertained in step 105.

The above-described procedure may be implemented either by partial analog integration or by digital summation. A mix of analog integration and digital summation is also possible.

The following implementation options may be considered, for example:
- HW-wired analog integration;
- oversampling using extremely fast and high-resolution analog/digital converters and subsequent evaluation in software; the integration character is properly fulfilled in particular when the sampling frequency is very high;
- implementation in hardware using fast delta/sigma modulators and subsequent summation via hardware counters;
- use of very fast voltage/frequency converters and downstream hardware logic composed of counters.

Figure 4:
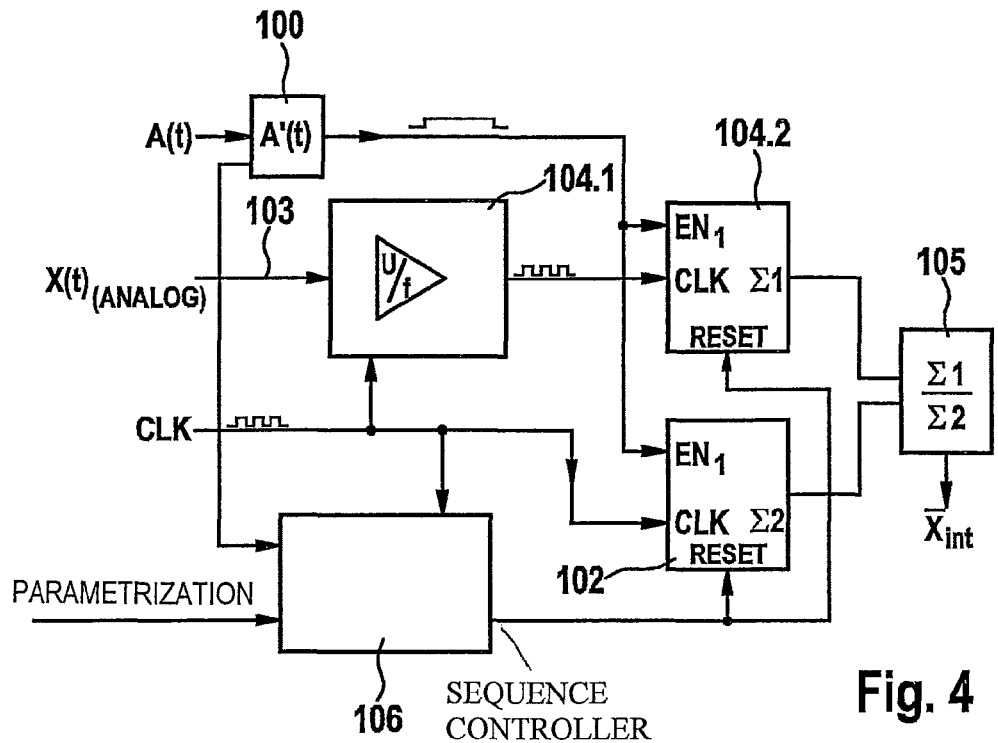
FIG. 4 shows an explanatory illustration of an advantageous cooperation of the steps of the method according to the present invention according to a first specific embodiment.

FIG. 4 shows an explanatory illustration of an advantageous cooperation of the steps of the method according to the present invention according to a first specific embodiment. The method is implemented here with the aid of a voltage/frequency converter. In this first specific embodiment the integration (step 104) is performed as mixed implementation. While reference numeral 104.1 identifies the analog integration step with the aid of voltage/frequency converters, reference numeral 104.2 stands for digital summation, for example, with the aid of counters.

Figure 5:
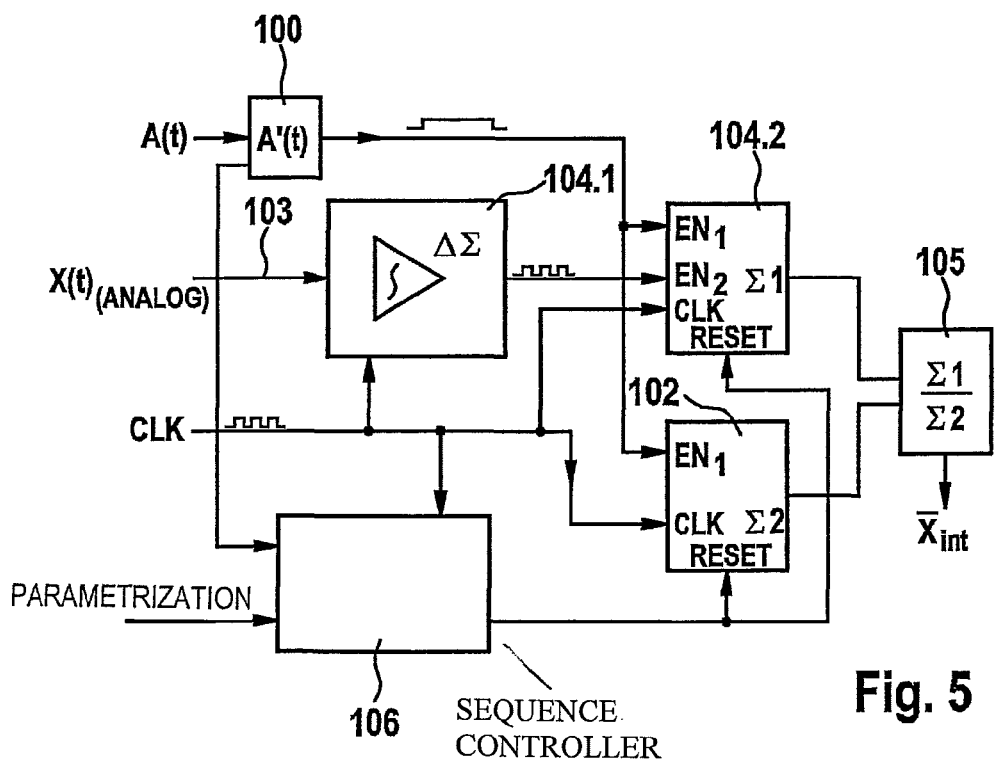
FIG. 5 shows an explanatory illustration of an advantageous cooperation of the steps of the method according to the present invention according to a second specific embodiment.

FIG. 5 shows an explanatory illustration of an advantageous cooperation of the steps of the method according to the present invention according to a second specific embodiment. The method is implemented here with the aid of delta/sigma modulators. While reference numeral 104.1 identifies the analog integration step with the aid of the delta/sigma modulators, reference numeral 104.2 stands for digital summation, for example, with the aid of counters.

The embedding of the method according to the present invention into an integrative measurement method in cyclically controlled systems for detecting the rotational speed of DC motors is described below with reference to FIGS. 6, 7, and 8.

The generator coasting voltage is measured according to the present invention with the help of an integrative measurement method. The integration time is adjustable. This applies to both the starting point in time and the end point in time of the particular integration time periods and thus ultimately also to the duration of the integration time periods. The implementation described below makes it possible to significantly reduce speed-dependent interference signal components such as those resulting due to the commutator of the electric motor, which may improve the quality of the ascertained coasting voltage value. This ultimately makes a more accurate motor regulation possible, especially at low rotational speeds.

Figure 6:
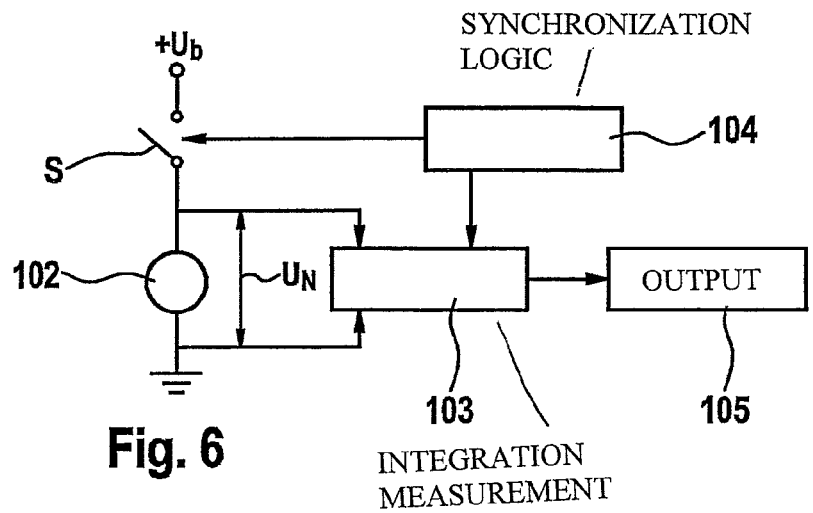
FIG. 6 shows a simplified explanatory illustration of an advantageous cooperation of the steps of the method according to the present invention according to an exemplary specific embodiment.

FIG. 6 shows a simplified schematic illustration of the measurement of the generator coasting voltage as a component of ascertaining the rotational speed. During motor control, synchronization logic 104 introduces no-control phases in which DC motor 102 generates a generator coasting voltage $U_N$, which may differ from operating voltage $U_b$ when switch S is closed (in general $U_N < U_b$). The coasting voltage is proportional to the motor speed. When the coasting voltage has been ascertained, the motor control continues. According to the method according to the present invention, the coasting voltage is ascertained in at least one of these no-control phases with the aid of an integrative measurement method 103 (the computed generator voltage is then output in block 105). The duration of the no-control phase is adjusted as a function of the desired or needed measurement quality. For example, at low rotational speeds a longer no-control phase is selected than at high rotational speeds. This makes it possible to better filter out interfering components in the lower motor speed range and to obtain higher dynamics in the higher motor speed range. In addition, the duration of the no-control phase may be made dependent on the load. For example, at a higher DC motor load, a shorter no-control phase may be selected to ensure the highest possible motor output. At a lower motor load, a more precise measurement and thus a more precise speed regulation may be achieved via longer no-control phases.

Figure 7:
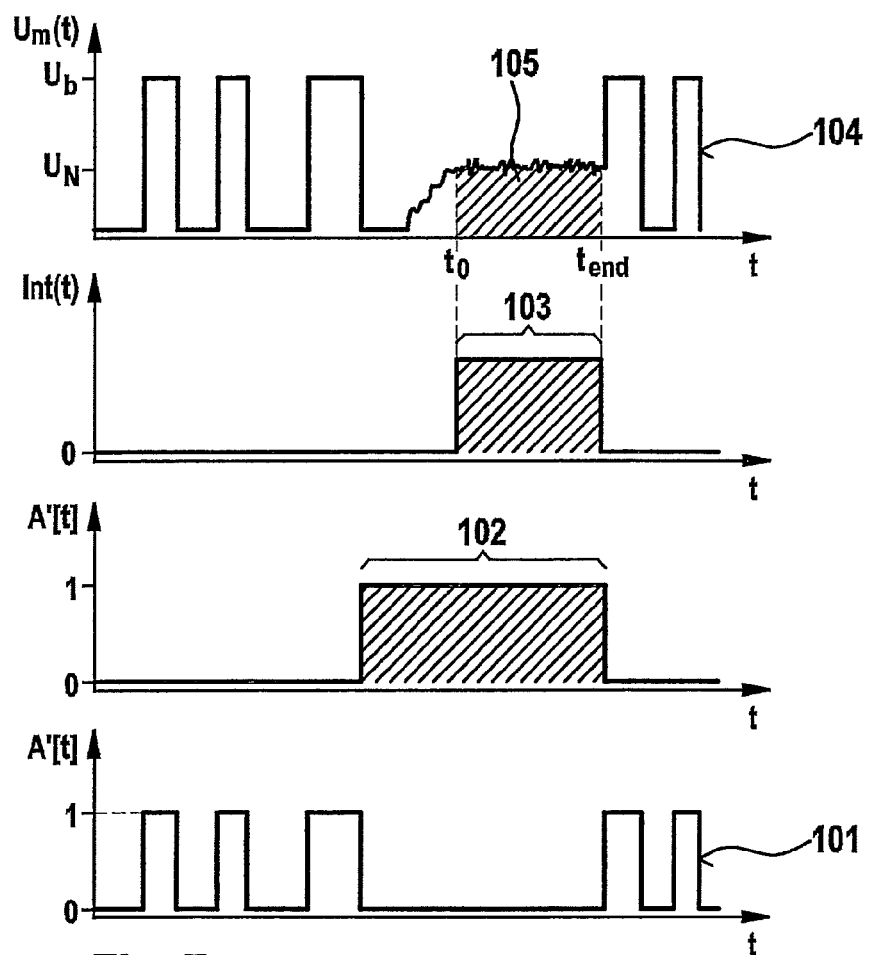
FIG. 7 shows the time graph of different signals within the execution of the method of the present invention according to the exemplary specific embodiment.

FIG. 7 illustrates the time sequence of the measurement of the generator coasting voltage according to a specific embodiment of the present invention. In the lowermost graph, the time sequence of motor control 101 is illustrated (A'(t)=0→no motor control; A'(t)=1→a motor is controlled). In the second graph from the bottom, the time sequence of a longer no-control phase 102 is illustrated (A'(t)=1→no-control phase), which corresponds to that of the longer phase A'(t)=0 in lower motor control graph 101. In the second graph from the top, integration time period 103 (Int(t)=1) is illustrated, which is located within no-control time period 102. Uppermost graph 104 shows the time sequence of motor voltage $U_m(t)$ as a function of motor control 101, the longer no-control phase 102, and integration phase 103 immediately thereunder. During the motor control phases, supply voltage $U_b$ drops across the motor. In longer no-control phases, coasting voltage $U_N$ drops across the motor after some time.

In the longer no-control phase 102, motor control 101 is interrupted, i.e., motor switch S in FIG. 6 is interrupted.

Integration phase 103 (where Int(t)=1) starts after the inductive current has been reduced in the DC motor. Starting point $t_0$ of integration phase 103 may be determined, for example, via a constant time delay with respect to the start of the longer no-control phase 102. End point $t_{end}$ of integration phase 103 may be situated before the end of the may, no-control phase. End point $t_{end}$ may, however, also coincide with the end of the no-control phase. Measured motor voltage $U_m$ in graphs 104 is ascertained integratively during integration phase 103 as explained in detail at the beginning of the description. Shaded area 105 in graph 104 corresponds to the integral over motor voltage $U_m$ during integration phase 103.

Figure 8:
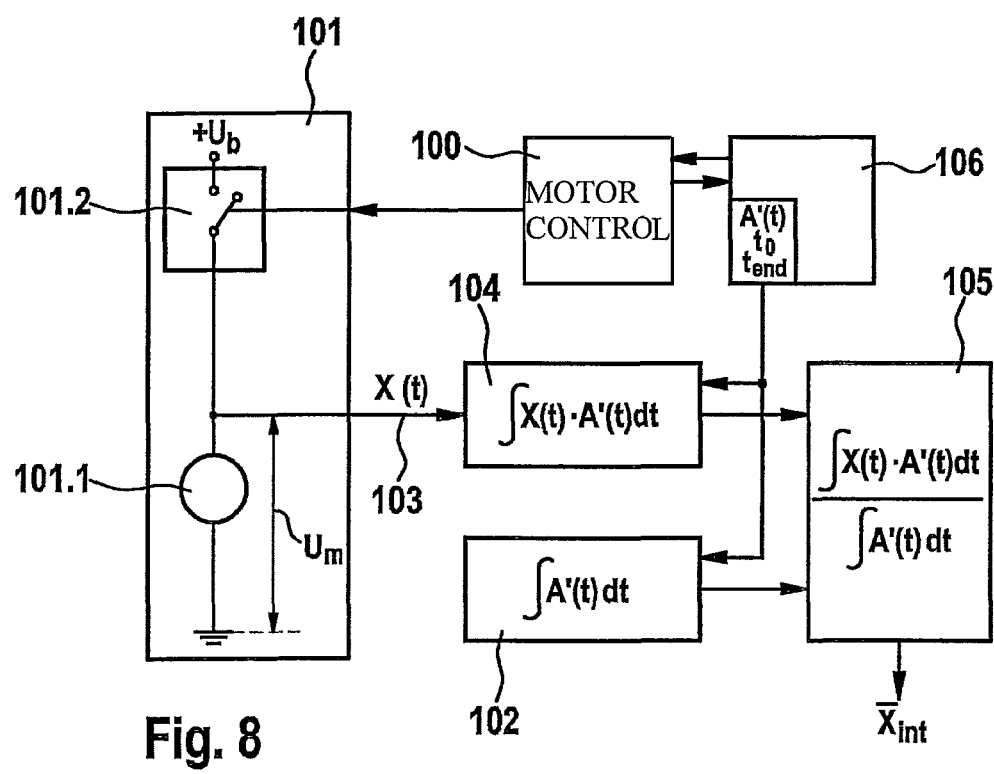
FIG. 8 shows a detailed explanatory illustration of the advantageous cooperation of the steps of the method according to the present invention according to the exemplary specific embodiment.

FIG. 8 shows a detailed explanatory illustration of the advantageous cooperation of the steps of the method according to the present invention in the above-described integrative measurement method for DC motor speed detection. The right-hand side of FIG. 8 is the same as in FIG. 2; therefore, in order to avoid repetitions regarding the same figure components, reference is made to the corresponding previous explanations regarding FIG. 2. In the left-hand part of FIG. 8, the block "controlled system" 101 shows the schematic motor path of a DC motor control. Motor switch 101.2, which may be embodied as a semiconductor switch, is controlled by motor control 100. DC motor 101.1 is connected to voltage supply $U_b$ via motor switch 101.2. Sequence control 106 generates A'(t) and $t_0$ and $t_{end}$. During no-control phase 102, A' (t) assumes the value 1.

The above-described method is particularly well-suited for ESP or ABS motor control. The present invention is, however, not limited to use in these areas.

What is claimed is:

1. A method for ascertaining measured values in a cyclically controlled system, the cyclic control having control time periods in which the system is controlled, and no-control time periods in which the system is not controlled, the method comprising:
    determining first integration time periods as a function of the cyclic control, the first integration time periods being situated within at least one of the control time periods;
    determining second integration time periods as a function of the cyclic control, the second integration time periods being situated within at least one of the no-control time periods;
    detecting a measured variable of the system, dependent on the control;
    ascertaining at least one of summation values and integration values by at least one of summation and integration of a measured variable during the first integration time periods and the second integration time period; and
    ascertaining the measured value for at least one of the control time periods and the no-control time periods based on time data of the first integration time periods and the second integration time periods and based on at least one of the ascertained summation values and the ascertained integration values.

2. The method of claim 1, wherein the cyclically controlled system is a DC motor.

3. The method of claim 2, wherein the measured variable of the system dependent on the control is a generator voltage, which is a generator coasting voltage of the DC motor.

4. The method of claim 2, wherein the time data, which includes the duration, of the second integration time periods are determined as a function of at least one of a motor load and a motor speed.

5. The method of claim 2, wherein the motor speed is ascertained based on an ascertained measured value of the generator coasting voltage.

6. The method of claim 1, wherein the execution of ascertaining at least one of summation values and integration values includes the use of at least one of digital summation and analog integration.

7. The method of claim 6, wherein the execution of ascertaining at least one of summation values and integration values is implemented by mixing at least one analog integration operation, with the aid of a voltage/frequency converter, and at least one digital summation, with the aid of a hardware logic composed of counters.

8. The method of claim 6, wherein the execution of ascertaining at least one of summation values and integration values is implemented by mixing at least one analog integration operation, with the aid of delta/sigma modulators, and at least one digital summation, with the aid of a hardware logic composed of counters.

9. The method of claim 1, wherein the first integration time periods and the second integration time periods are determined also as a function of at least one individual parameter of the system.

10. The method of claim 9, wherein at least one of an inertia of the system and a measuring environment of the system is taken into account in the individual parameters.

11. The method of claim 9, wherein the time delay of the system's response to the controls is taken into account in the individual parameters.

12. The method of claim 9, wherein the time delay in executing at least one or more of the detecting operations, the operations of ascertaining at least one of summation values and integration values, and the operation of ascertaining the measured value are taken into account in the individual parameters.

* * * * *

UNITED STATES PATENT AND TRADEMARK OFFICE
CERTIFICATE OF CORRECTION

PATENT NO. : 8,493,007 B2
APPLICATION NO. : 13/056915
DATED : July 23, 2013
INVENTOR(S) : Schmidtlein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this
Eighth Day of September, 2015

Michelle K. Lee
*Director of the United States Patent and Trademark Office*